United States Patent
Stipes et al.

(10) Patent No.: US 9,377,310 B2
(45) Date of Patent: Jun. 28, 2016

(54) MAPPING AND POSITIONING SYSTEM

(71) Applicant: The Johns Hopkins University, Baltimore, MD (US)

(72) Inventors: Jason A. Stipes, Ellicott City, MD (US); John C. Humphreys, Woodbine, MD (US); Richard A. Startt, Taneytown, MD (US)

(73) Assignee: The Johns Hopkins University, Baltimore, MD (US)

( * ) Notice: Subject to any disclaimer, the term of this patent is extended or adjusted under 35 U.S.C. 154(b) by 43 days.

(21) Appl. No.: 14/266,858

(22) Filed: May 1, 2014

(65) Prior Publication Data

US 2014/0379256 A1 Dec. 25, 2014

Related U.S. Application Data

(60) Provisional application No. 61/818,594, filed on May 2, 2013.

(51) Int. Cl.
*G01C 21/10* (2006.01)
*G01C 21/16* (2006.01)
(Continued)

(52) U.S. Cl.
CPC ............ *G01C 21/165* (2013.01); *G01C 21/206* (2013.01); *G01C 21/32* (2013.01); *G01C 22/006* (2013.01)

(58) Field of Classification Search
CPC ...... G01C 21/16; G01C 21/28; G01C 21/005; G01C 22/06; G01S 19/47
USPC ........................................................ 701/501
See application file for complete search history.

(56) References Cited

U.S. PATENT DOCUMENTS 5,661,649 A * 8/1997 Carson ..................... G01V 7/16 702/2
6,594,617 B2 7/2003 Scherzinger
(Continued)

FOREIGN PATENT DOCUMENTS

| CA | 2269957 A1 * | 10/1999 |
| EP | 1176393 | 1/2002 |
| GB | 2465072 | 5/2010 |

OTHER PUBLICATIONS

U.S. Navy Marine Mammal Program> Frequently Asked Questions: Sep. 28, 2010: 4 pages, last accessed Aug. 7, 2015 @ https://web.archive.org/web/20100928182427/http://www.public.navy.mil/spawar/Pacific/71500/Pages/faqs.aspx.*

*Primary Examiner* — Behrang Badii
*Assistant Examiner* — Daniel L Greene
(74) *Attorney, Agent, or Firm* — Noah J. Hayward

(57) ABSTRACT

A mapping and positioning apparatus may include an IMU module for monitoring movement through an environment, a scanner module, and a control unit. The IMU module is configured to monitor movement on the basis of detecting steps taken by a transporter. The scanner module may be configured to employ laser scanning to determine distances to objects or boundaries in the environment as the transporter moves the apparatus through the environment. The control unit may be configured to receive data from at least the IMU module and the scanner module and make an environmental determination to classify the environment. The control unit may be configured to generate map data based on the data received from the IMU module and the scanner module. The control unit may be configured to adaptively adjust processing of the data received from the IMU module and the scanner module based on a classification of the environment.

20 Claims, 5 Drawing Sheets

(51) Int. Cl.
*G01C 21/20* (2006.01)
*G01C 21/32* (2006.01)
*G01C 22/00* (2006.01)

(56) References Cited

U.S. PATENT DOCUMENTS

| | | | |
|---|---|---|---|
| 6,608,913 B1* | 8/2003 | Hinton et al. | 382/104 |
| 6,837,106 B2* | 1/2005 | Etkin | G01V 7/16 73/382 G |
| 6,917,893 B2 | 7/2005 | Dietsch et al. | |
| 7,184,088 B1* | 2/2007 | Ball | 348/348 |
| 7,516,039 B2 | 4/2009 | McKitterick | |
| 8,200,423 B2 | 6/2012 | Dietsch et al. | |
| 2002/0143491 A1 | 10/2002 | Scherzinger | |
| 2003/0035100 A1* | 2/2003 | Dimsdale et al. | 356/124 |
| 2005/0082091 A1* | 4/2005 | Kingsley | 175/207 |
| 2006/0120601 A1 | 6/2006 | Dietsch et al. | |
| 2007/0079962 A1* | 4/2007 | Zazovsky et al. | 166/264 |
| 2007/0236343 A1* | 10/2007 | Becksted et al. | 340/521 |
| 2008/0027591 A1* | 1/2008 | Lenser et al. | 701/2 |
| 2008/0040071 A1 | 2/2008 | McKitterick | |
| 2008/0212838 A1* | 9/2008 | Frigerio | 382/107 |
| 2009/0262974 A1 | 10/2009 | Lithopoulos | |
| 2011/0054689 A1* | 3/2011 | Nielsen et al. | 700/258 |
| 2011/0208745 A1 | 8/2011 | Dietsch et al. | |
| 2011/0282622 A1 | 11/2011 | Canter | |
| 2013/0013185 A1 | 1/2013 | Smitherman et al. | |
| 2013/0131985 A1* | 5/2013 | Weiland et al. | 701/516 |

* cited by examiner

MAPPING AND POSITIONING SYSTEM

CROSS-REFERENCE TO RELATED APPLICATIONS

This application claims priority to and the benefit of U.S. Provisional Application Ser. No. 61/818,594 filed on May 2, 2013, the entire contents of which are hereby incorporated herein by reference.

STATEMENT OF GOVERNMENTAL INTEREST

This invention was made with government support under contract number N00024-03-D-6606 awarded by the Naval Sea Systems Command (NAVSEA). The government has certain rights in the invention.

TECHNICAL FIELD

Exemplary embodiments of the present disclosure generally relate to mapping and navigation technology, and more specifically relate to a system for providing mapping and navigation services in challenging environments such as in global positioning system (GPS) denied environments.

BACKGROUND

Mapping and positioning services are often built around the use of GPS for position determination. However, GPS cannot be employed in all environments. To facilitate the provision of such services in environments in which GPS is inhibited or completely denied, other means must be relied upon for determining position. Inertial navigation is one potential substitute for GPS that may be used in some cases. However, balancing the interaction of inertial navigation devices with other sensors or devices that must be employed to provide the services is not a trivial exercise. Thus, it is desirable to provide an enhanced mapping and positioning system that can maximize the capabilities of the components employed to automatically generate physical maps of GPS-denied environments in real time.

BRIEF SUMMARY OF SOME EXAMPLES

Some example embodiments may enable the provision of a system capable of automatically generating physical maps (and in some cases also providing annotations thereon) without assistance from GPS in a real time environment. Some example embodiments may further combine the mapping and navigation components (e.g., a laser scanner and inertial measurement unit (IMU)) in an intelligent way. In this regard, for example, environments in which one of the components is expected to struggle can be identified so that increased reliance may be placed on the other component. Example embodiments may therefore define a mechanism by which to adaptively respond to the environment by adjusting the usage of the components.

In one example embodiment, a mapping and positioning apparatus is provided. The apparatus may include an inertial measurement unit (IMU) module configured to monitor movement of the apparatus through an environment, a scanner module, and a control unit. The IMU module may be configured to monitor the movement at least in part on the basis of detecting steps taken by a transporter of the apparatus. The scanner module may be configured to employ laser scanning to determine distances to objects or boundaries in the environment as the transporter moves the apparatus through the environment. The control unit may be configured to receive data from at least the IMU module and the scanner module and make an environmental determination to classify the environment. The control unit may be configured to generate map data based on the data received from the IMU module and the scanner module. The control unit may be configured to adaptively adjust processing of the data received from the IMU module and the scanner module based on a classification of the environment.

In another example embodiment, a method of processing data for map generation is provided. The method may include monitoring movement of an apparatus through an environment using an inertial measurement unit (IMU) module and a scanner module. The IMU module may be configured to monitor the movement at least in part on the basis of detecting steps taken by a transporter of the apparatus. The scanner module may be configured to employ laser scanning to determine distances to objects or boundaries in the environment as the transporter moves the apparatus through the environment. The method may further include making an environmental determination to classify the environment and generating map data based on data received from the IMU module and the scanner module, and adaptively adjusting processing of the data received from the IMU module and the scanner module based on a classification of the environment.

BRIEF DESCRIPTION OF THE SEVERAL VIEWS OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
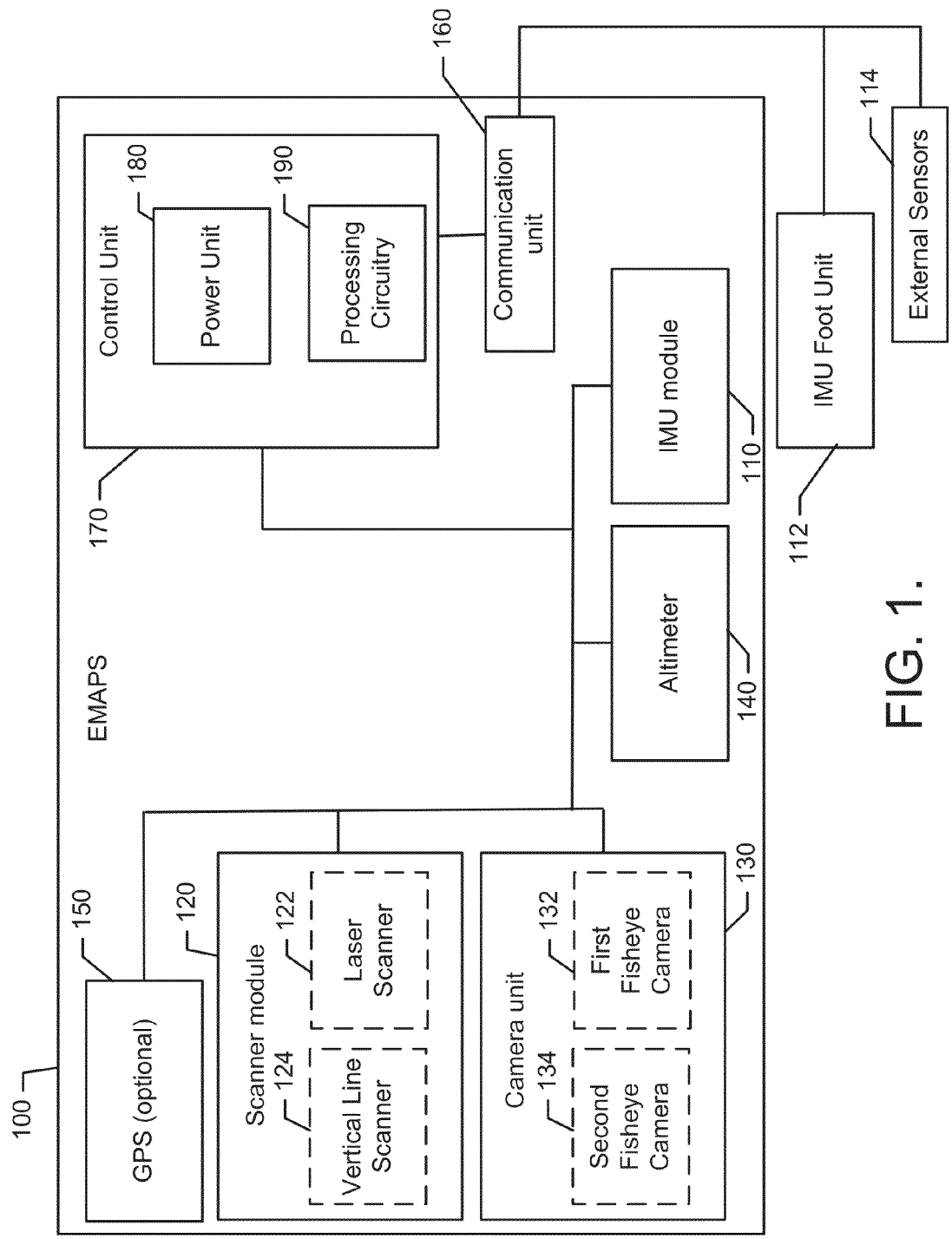
FIG. 1 illustrates a block diagram showing components of a system to facilitate mapping and positioning in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As mentioned above, in some environments, certain ones of mapping and navigation components may struggle to produce accurate results. For example, in a long smooth hallway, a laser scanner may tend to generate curves or arcs instead of straight lines. Similarly, in a large room with few features, the laser scanner may struggle to produce accurate mapping results. Some example embodiments may therefore balance employment of an IMU and laser scanner in an intelligent way that identifies difficult environments for one component (e.g., the laser scanner) and then increases reliance on data from the other (e.g., the IMU). An adaptive mapping and positioning system may therefore be provided.

FIG. 1 illustrates a block diagram showing components of a system to facilitate mapping and positioning in accordance with an example embodiment. In this regard, as shown in FIG. 1, an adaptive system that may operate as an enhanced mapping and positioning system (EMAPS) 100 may be provided with an inertial measurement unit (IMU) module 110 and a scanner module 120. The EMAPS 100 may also, in some cases, further incorporate a camera unit 130 and/or an altimeter 140. Furthermore, although not required, the system may incorporate a GPS unit 150 and a communication unit 160. The EMAPS 100 may also include a control unit 170 including a power unit 180 and processing circuitry 190. In an example embodiment, the power unit 180 may be embodied as a battery or battery pack.

The EMAPS 100 may be configured as a backpack unit that can be transported on the back of the user. The IMU module 110 may be a six degrees of freedom IMU. As such, the IMU module 110 may be or include an inertial sensor configured to measure the roll, pitch and yaw of the EMAPS 100, and also measure movement in the XY plane based on the detection of steps of the user. In some embodiments, the IMU module may be configured to detect movement of the backpack unit itself in order to determine each step taken by the user or transporter.

As an alternative to having the IMU module 110 detect steps itself, the EMAPS 100 may be configured to detect user steps based on a sensor provided at or proximate to the foot of the user (i.e., the transporter of the EMAPS 100). In such cases, an IMU foot unit 112 may be provided to communicate with the control unit 170 via the communication unit 160. The IMU foot unit 112 may include its own six degree of freedom IMU and/or may act as an inertial pedometer to allow position tracking in featureless environments. Optionally, the IMU foot unit 112 could also include a GPS module. Although not required, a wired connection (e.g., a wired Ethernet connection) from the backpack unit of the EMAPS 100 may be provided to the IMU foot unit 112 to avoid having any frequency emissions. In other cases, the IMU foot unit 112 and the communication unit 160 may each be provided with BLUETOOTH®, WiFi or other short range communication capabilities to enable communication therebetween. The communication unit 160 may also enable the control unit 170 to receive data from external sensors 114 for processing and/or storage. The external sensors 114 may include various detectors or sensors configured to measure or detect such things as gamma rays, neutrons, RF signals and/or the like. Alternatively or additionally, the external sensors 114 may be configured as a magnetometer, an omnidirectional camera, a single-lens reflex (SLR) camera, a thermal imager and/or the like.

The scanner module 120 may include one or both of a laser scanner 122 and a vertical laser scanner 124. Given that the EMAPS 100 may be worn on the back of the user, the laser scanner 122 may be configured as a 270 degree laser scanner that can emit signals and measure returns to measure the distances to walls and other features in the environment. Thus, the laser scanner 122 may be configured to measure distances from the user's back and sides. The laser scanner 122 may generally be configured to make such measurements within the horizontal plane. However, it should be appreciated that motion of the EMAPS 100 may cause some ceiling and floor contact in certain situations. If employed, the vertical laser scanner 124 may scan outside the horizontal plane in order to enable three dimensional (3D) data collection. As such, the scanner module 120 may be configured to gather data regarding the distances to boundary and other features within the environment in either two or three dimensions.

The camera unit 130 may include one or more cameras oriented in a desired way to capture images behind the user, to the sides of the user, or in any other visible area around the user. In some cases, the camera unit 130 may be provided with a 360 degree camera (e.g., if the camera unit 130 can be elevated over the head of the user to get a 360 degree view. The camera unit 130 may include two fish eye cameras (e.g., first fish eye camera 132 and second fish eye camera 134) and be configured to capture images (including omnidirectional images) along the path traversed by the user and the EMAPS 100. In some cases, the camera unit 130 may include memory (e.g., local fixed memory, or removable memory), or the camera unit 130 may provide image data to the control unit 170 for storage of the image data at the control unit 170. The image data may thereafter be analyzed, studied and reviewed by analysts and, in some cases, the analysts may be enabled to click and drag or advance and rewind the image data in a controlled fashion in order to facilitate detailed analysis of the image data.

The altimeter 140 may be embodied as a barometric altimeter or any other suitable device for measuring changes in altitude. In embodiments in which the altimeter 140 is employed, the altimeter 140 may be configured to automatically detect floor or level changes or other changes in altitude within a building or environment. The GPS unit 150, if employed, may be used to conduct georegistration of data collected. In some cases, the GPS unit 150 may be connected to the system via USB ports or other interface mechanisms which may form a portion of the communication unit 160.

Figure 2:
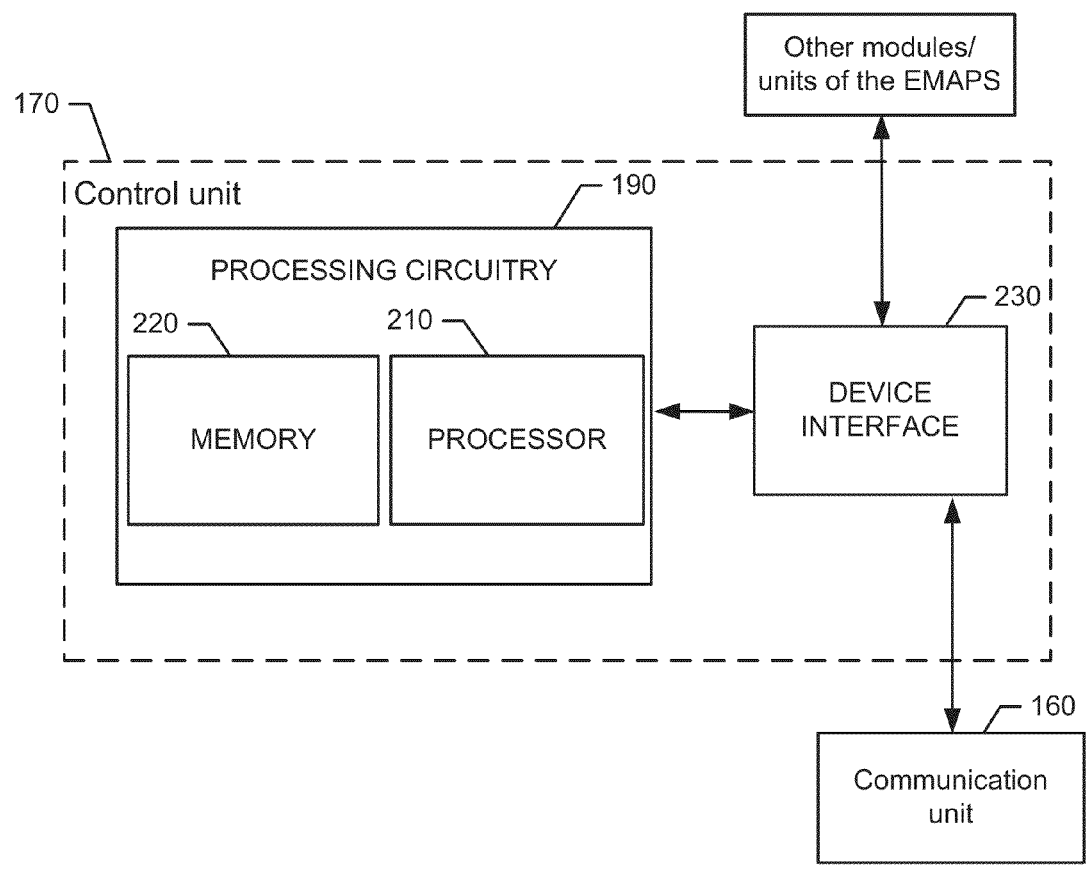
FIG. 2 illustrates a block diagram of one example of processing circuitry associated with execution of an example embodiment.

FIG. 2 illustrates a block diagram of an example how the control unit 170 may employ processing circuitry 190 in accordance with an example embodiment. As shown in FIG. 2, the control unit 170 may include processing circuitry 190 that is configurable to perform actions in accordance with example embodiments described herein. As such, for example, at least some of the functions attributable to the control unit 170 (and/or entities/components thereof) may be carried out by or otherwise instructed by the processing circuitry 190. The processing circuitry 190 may therefore provide the hardware for hosting software to configure the system for module control and implementation of monitoring, analysis and/or control techniques consistent with example embodiments.

The processing circuitry 190 may be configured to perform data processing, control function execution and/or other processing and management services according to an example embodiment of the present invention. In some embodiments, the processing circuitry 190 may be embodied as a chip or chip set. In other words, the processing circuitry 190 may comprise one or more physical packages (e.g., chips) including materials, components and/or wires on a structural assembly (e.g., a baseboard).

In an example embodiment, the processing circuitry 190 may include one or more instances of a processor 210 and memory 220 that may be in communication with or otherwise control a device interface 230. As such, the processing circuitry 190 may be embodied as a circuit chip (e.g., an integrated circuit chip) configured (e.g., with hardware, software or a combination of hardware and software) to perform operations described herein.

The device interface 230 may include one or more interface mechanisms for enabling communication with other external devices (e.g., output devices, input devices, and/or the like) or the modules/components of the EMAPS 100. In some cases, the device interface 230 may be any means such as a device or circuitry embodied in either hardware, or a combination of hardware and software that is configured to receive and/or transmit data from/to devices and/or modules in communication with the processing circuitry 190. Thus, the device interface 230 may enable the processor 210 to communicate with the communication unit 160 and/or other modules/units of the EMAPS 100 that are shown in FIG. 1.

In an exemplary embodiment, the memory 220 may include one or more non-transitory memory devices such as, for example, volatile and/or non-volatile memory that may be either fixed or removable. The memory 220 may be configured to store information, data, applications, instructions or the like for enabling the processing circuitry 190 to carry out various functions in accordance with exemplary embodiments of the present invention. For example, the memory 220 could be configured to buffer input data for processing by the processor 210. Additionally or alternatively, the memory 220 could be configured to store instructions for execution by the processor 210. As yet another alternative, the memory 220 may include one or more databases that may store data, images, and/or the like that have been captured by components of the EMAPS 100 and/or the external sensors 114 to be employed for the execution of example embodiments. In some cases, the data sets may also or alternatively store instructions for generation of maps that reconstruct the environment traversed by the EMAPS 100. However, it should be appreciated that the processing of data for map generation could alternatively be performed by a separate computer system receiving raw or processed data from the EMAPS 100 in some embodiments. Among the contents of the memory 220, applications may be stored for execution by the processor 210 in order to carry out the functionality associated with each respective application. In some cases, the applications may include directions for control of the processing circuitry 190 to enable data to be processed and/or maps to generated. In some embodiments, the maps may further be annotated via the processing circuitry 190 in order to correlate data gathered via the external sensors 114 with corresponding locations at which the data was gathered.

The processor 210 may be embodied in a number of different ways. For example, the processor 210 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 210 may be configured to execute instructions stored in the memory 220 or otherwise accessible to the processor 210. As such, whether configured by hardware or by a combination of hardware and software, the processor 210 may represent an entity (e.g., physically embodied in circuitry—in the form of processing circuitry 190) capable of performing operations according to embodiments of the present invention while configured accordingly. Thus, for example, when the processor 210 is embodied as an ASIC, FPGA or the like, the processor 210 may be specifically configured hardware for conducting the operations described herein. Alternatively, as another example, when the processor 210 is embodied as an executor of software instructions, the instructions may specifically configure the processor 210 (which could in some cases otherwise be a general purpose processor) to perform the operations described herein.

In an example embodiment, the processor 210 (or the processing circuitry 190) may be embodied as, include or otherwise control the modules of the EMAPS 100. As such, in some embodiments, the processor 210 (or the processing circuitry 190) may be said to cause each of the operations described in connection with the modules of the EMAPS 100 to undertake the corresponding functionalities responsive to execution of instructions or algorithms configuring the processor 210 (or processing circuitry 190) accordingly.

Figure 3:
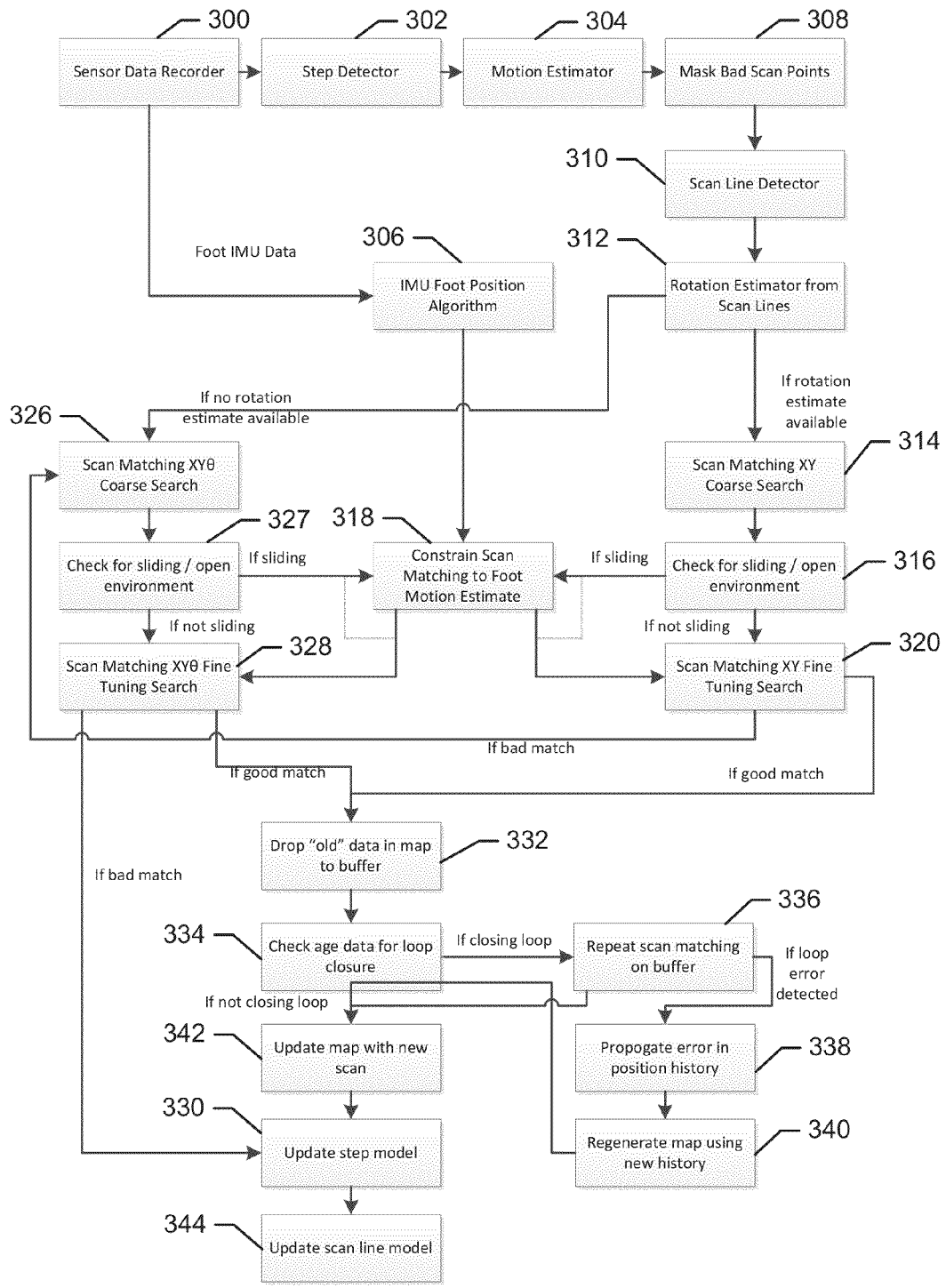
FIG. 3 illustrates a block diagram of an algorithm for mapping and positioning in accordance with an example embodiment.

FIG. 3 illustrates a block diagram of an algorithm for mapping and positioning in accordance with an example embodiment. As shown in FIG. 3, sensor data may initially be recorded at operation 300. In some embodiments, sensor data from the external sensors 114, the scanner module 120, the IMU module 110, the camera unit 130, the altimeter 140 and/or from the IMU foot unit 112 or GPS unit 150 (if used) may be recorded and time tagged. Storage of the data may be accomplished via the memory 220 or via other removable, local or remote storage devices. In some cases, the sensor data may include various metadata associated therewith, which may also be recorded. The data may be associated or synchronized based on the time tags and/or metadata associated with the data. In some cases, the data may be pre-processed prior to being stored. For example, image data may be compressed to reduce file size. Some of the data may be recorded for later analysis and/or usage by other devices. However, some of the data may be buffered and/or passed on for further processing in accordance with the operations of FIG. 3.

At operation 302, at least some of the data may be processed to detect steps. In some cases, z-axis acceleration may be monitored in order to detect steps. Given that the EMAPS 100 is configured to process and map data using the scanner module 120, and further given that the scanning data will not change when the user or transporter is stationary, the detection of steps may be useful in telling the control unit 170 to continue to process data since new and useful data is coming in when steps are being taken. However, if no steps are detected, the control unit 170 and stop processing incoming data from the scanner module 120 since it will be duplicative.

At operation 304, motion estimation may be performed. In this regard, data from the IMU module 110 may be processed to determine an estimate of how far (e.g., based on the number of steps and average distance associated with each step) the user or transporter has traveled with the EMAPS 100. In some cases, an IMU foot position algorithm may also run at operation 306, and may be fed with data from the motion estimation operation and the sensor data recorded at operation 300 to determine an estimate of position based on the movement estimated at operation 304.

A mask may then be applied at operation 308 in order to identify bad scan points from the recorded data. In this regard, for example, if the EMAPS 100 is subject to significant rocking or yaw, laser returns may be received outside of the XY plane (e.g., off the ceiling or floor). Mapping using laser scan data from the ceiling or floor may be inaccurate and should be discarded. By monitoring pitch, roll, and yaw data, situations can be identified where bad laser scan data is received, and the corresponding laser scan data may be discarded.

At operation 310, a scan line detector may run to process data for map generation. In this regard, the distances noted for laser returns received at various angles can be used to generate map data that essentially draws the boundaries of walls and features encountered by the scanner module 120. It should be appreciated that certain relatively featureless environments (e.g., long smooth hallways or large rooms) may tend to generate curved lines where the lines should actually be straight. This problem may cause the breakdown of typical mapping algorithms. Operation 310 is conducted by the processing circuitry 190 to identify challenging or relatively featureless environments. Thus, for example, the laser scan data is processed to identify relatively featureless environments so that such environments can be adaptively treated as described herein.

At operation 312, a rotation estimation operation is conducted to keep track of heading of the user or transporter as the EMAPS 100 is moved through an environment. If rotation estimate is available, then scan matching of XY coarse searching may be conducted at operation 314. Operation 314 may facilitate real time estimating in sliding environments (i.e., environments that are relatively featureless and in which adaptive treatment is desired). At operation 316, a check may be conducted to determine if the EMAPS 100 is in a sliding environment (i.e., an environment with no or relatively few changing features). If sliding is noted, at operation 318 scan matching may be constrained to motion estimates from operation 306 prior to proceeding to operation 320. If there is no sliding (or after operation 318 if sliding is detected), scan matching in the XY plane may undergo a fine tuned search at operation 320. This takes laser scan data and matches such data with constraints generated (e.g., based on IMU constraints). If the matching is good, the map may be updated at operation 322 and map portions may be drawn accordingly to generate the map. After map updating at operation 322, updated map data may be fed back into operation 314 in some cases. Additionally, the process may proceed to operation 324 where a step model is updated. Updating of the step model may involve motion estimation to track movement of the user/transporter in real time while feedback to the motion estimator may be provided.

If the matching is bad, or if no rotation was detected at operation 312, then scan matching may be conducted in XY and θ directions with a course search at operation 326. This provides extra (and more time consuming) processing by adding an addition dimension of data to the processing. A determination as to whether a sliding or open environment exists may then be conducted at operation 327. A fine tuning search involving scan matching of the XY and θ directions may then be conducted at operation 328 if there is no sliding. If sliding is noted, at operation 318 scan matching may be constrained to motion estimates from operation 306 prior to proceeding to operation 328. If a bad match is achieved, then the step model may be updated at operation 330. If a good match is achieved after either operation 328 or operation 320, then old data from the map may be dropped into a buffer at operation 332.

At operation 334, a check may be conducted to determine if any loops have been completed such that loop closure can occur. As such, if it can be identified that the device has returned to one or more previously identified locations (i.e., due to completing a loop), the loop may be closed if it can be detected that a loop has occurred. Any error accumulated during transit before completing the loop may be reset and alignment of old and new data may be conducted. If a loop is being closed, scan matching on the buffer data may be repeated at operation 336. If loop error is detected, the error may propagate in position history at operation 338 and the map may be regenerated at operation 340 using new history. If there is no loop closure, the map may be updated with new scan data at operation 342 after the check for loop closure at operation 334. The step model may be updated at operation 330 and the scan line model may be updated at operation 344. Of note, external sensor data may be gathered and data interpolation and location association may be conducted as well so that the sensor data can be incorporated into updating the map at operation 342.

The use of rotation determination and identification of sliding environments for determining the processing to be applied, and the alternative processing based on various scan matching operations creates an adaptive process that allows example embodiments to shift the balance between laser based and inertial movement based mapping and positioning assets based on the environment. In this regard, for example, since the inertial movement based asset (e.g., the foot based IMU) provides relatively good linear measurement, but relatively poor heading information, and the laser scan based asset provides relatively good heading information, but relatively poor linear measurement information, identification of sliding environments (i.e., where the laser scan asset is poor) will cause increased reliance on the inertial movement based asset. As a result, a relatively accurate map, even in GPS-denied environments, may be generated.

Positioning, mapping and surveying technology development is an area that has been dominated by developments primarily focused on the outdoor environment where access to satellite signals enable precise navigation and mapping using technologies such as GPS and GLOSNASS. This technology is not useful, however, in areas where access to positioning signals is blocked, such as the interior spaces of buildings, ships, and underground facilities. Example embodiments may therefore provide map generation and positioning information within GPS-denied structures through the use optical and inertial sensors coupled using novel algorithms.

Some example embodiments may assist in providing solutions to the problem of mapping and positioning within GPS-denied environments. Some algorithms called SLAM (Simultaneous Localization and Mapping) may use correlated information from the environment (such as laser based range data, camera data, inertial cues, and robot odometry) to form a map of the GPS-denied area. Example embodiments provided herein demonstrate features that enable SLAM mapping to be conducted with sensors borne by a human being (although a robot or service animal such as a dog may also be used) with accuracy and robustness in complex environments. Human motion is much more dynamic than the robotic vehicles originally employed to use SLAM algorithms and example embodiments address these dynamics. Some example embodiments also address shortcomings and limitations of optical SLAM algorithms, enabling greater map accuracy over larger distances. Additionally, the proposed approach allows maps and positioning to be generated in unbounded areas in real-time.

Figure 4:
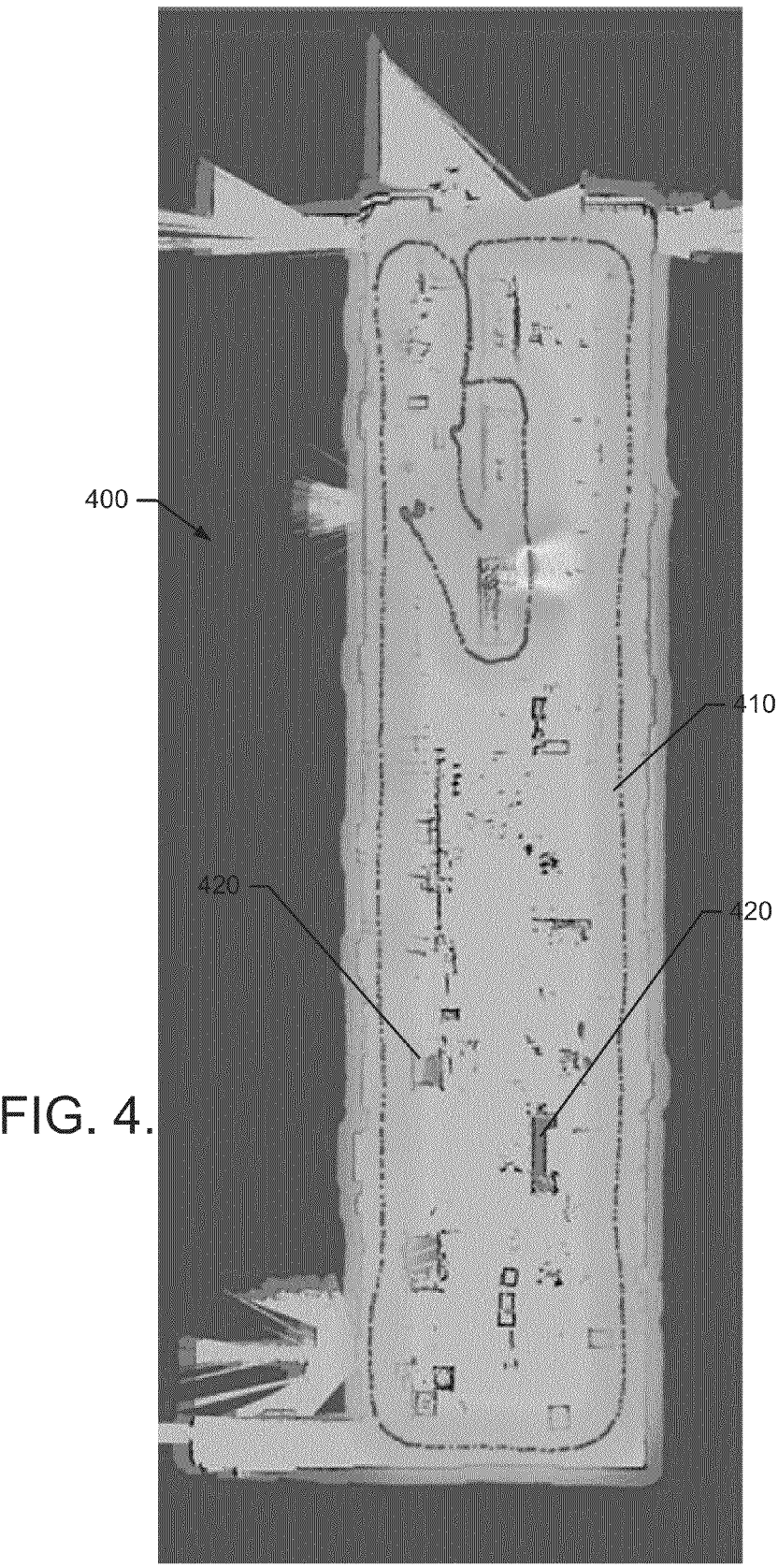
FIG. 4 illustrates an example map that may be generated in accordance with an example embodiment.

FIG. 4 illustrates an example of a map 400 that may be generated using an example embodiment. As shown in FIG. 4, a path 410 may be defined as the user/transporter moves through the environment. The laser scan asset may define distances to boundaries and/or objects and those distances may be mapped relative to movement defined by the inertial movement based asset as the path 410 is transited. As a result various features 420 may be identified and general contours of rooms, hallways, and boundaries may be defined. In some cases, the map may further be annotated with data from environmental sensors including, for example, radiological sensors (gamma, neutron), gas sensors, chemical sensors, RF sensors, spectrometers, magnetic sensors, temperature sensors, pressure sensors, or humidity sensors. Thus, the map may include levels, readings or other data obtained from the sensors at the corresponding locations at which the levels readings or other data were obtained.

Maps generated by the system may be stored in modular format so that a limited number of map modules may be loaded into computer memory at any one time, so mapping may be done in an unbounded area using a fixed amount of computer memory. At each location in the map several pieces of information are retained that are necessary for map generation and improve the speed of the algorithm so mapping may be done in real-time. Specifically, some or all of the following information is stored at each location: occupancy (whether or not there is an object at that location in the map), proximity (the distance to the nearest occupied location), oldest update (how long ago the location was first updated with any sensor data), most recent update (how long ago the location was last updated with any sensor data), buffered map data (duplicate map(s) with different coordinate registration for use in correcting loop closure errors or registration errors among multiple mappers), map uncertainty data, environmental sensor data (i.e. radiological sensors (gamma, neutron), gas sensors, chemical sensors, RF sensors/spectrometers, magnetic sensors, temperature sensors, pressure sensors, humidity sensors). This data storage scheme enables the algorithms described herein to function and to operate at real-time speed.

Human motion estimation algorithms are used to both pace the execution of the mapping algorithms and to reduce the uncertainty in mapping. Inertial sensors coupled with a step detection algorithm and kinematic model of human motion are used to sense when steps are taken and to estimate the position of the backpack sensor relative to foot location. By pacing the mapping algorithm based on when a step is taken or a rotation has occurred, redundant algorithm calculations are not performed when the user is standing still, thus conserving power and reducing the number of required calculations, allowing the algorithm to operate in real time.

The system may employ a rear-facing laser scanner because this orientation allows for the most unobstructed view. Forward facing sensors are easily occluded by the user's arms and normal motion. Rearward-facing lasers may encounter certain anomalies when used with common SLAM scan matching algorithms. Laser scan data is often sampled at fixed angular degrees, so surfaces closer to the sensor have more dense data then those areas further away from the sensor. In a forward-facing configuration, the densest laser data often overlaps areas mapped by previous scans while in a rear-facing configuration, the densest laser data often overlaps unexplored map areas. When scoring how well a scan matches the map, the rearward facing laser tends to bias the data towards the unexplored area, causing incorrect shifting of the scan alignment. To address this issue, example embodiments may down-samples the scan spatially, to provide equal weighting of the sensor data regardless of the sensor's distance from its target. In addition, scan samples bordering unexplored areas are masked in the scan weight calculation to prevent the bias derived from the rearward-facing laser scanner.

One common limitation of optical SLAM based algorithms may occur in connection with accounting for ambiguous geometries. One example of this is a long smooth hallway. The laser scan of such an environment is simply two parallel straight lines. To register two such scans to one another, it is straightforward to align the lines in the direction perpendicular to the direction of the hallway, but the registration along the hallway is ambiguous because all registrations are equivalent. To address this situation, example embodiments may combine the data from a foot-based pedometer to constrain the motion along the length of the hallway. The foot-based inertial pedometer technology may enable measuring distance traveled with accuracy because each time the foot touches the ground, biases in the inertial system may be corrected because the foot has a known zero velocity at that moment. This allows for such systems to measure distance traveled to an accuracy of around 1% of distance traveled. Foot-based inertial systems, however, may be relatively inaccurate in rotation, accumulating error quickly. By taking the approach of combining the foot-based inertial system, which is accurate in distance traveled, and the optical laser scan matching approach, which is very accurate in rotation, performance not previously possible can be realized in all mapping areas, including those ambiguous locations like the long smooth hallway.

In an example embodiment, the foot based pedometer motion data is integrated with the laser mapping data, which is located in a backpack attached to the torso, using an algorithm to model the relationship between the foot kinematics and the torso location. By sensing when a step has taken place, and the orientation of the foot in its walking trajectory, it is possible to constrain the possible locations and orientations of the laser sensor located in the backpack using a kinematic model of the human body and input from the inertial system co-located with the laser sensor. By synchronizing the correlations being made between the laser based map and the distance traversed by the foot-based sensor to the exact same time in the step cycle, uncertainty may be reduced and the distance traveled by the foot may be correlated to the position of the backpack based sensor within a fixed error amount, regardless of distance traveled. Furthermore, the motion estimated by the foot base pedometer may be used only to constrain the scan matching algorithm used by the system. This approach allows for the best aspects of the two sensing modalities, the rotational accuracy of the laser based data and the distance accuracy of the foot based inertial system, to be successfully combined even in difficult, ambiguous environments.

Current scan-matching based SLAM algorithms have a common potential to slowly curve long straight lines in maps due to the resolution of an occupancy grid-based map. A straight line from a laser scanner is pixelized and fit into a grid in occupancy-grid based SLAM algorithms. This fit may vary rotationally by a small amount due to the finite resolution of the underlying map grid. Over a long distance, these variations in rotation can accumulate to make a long straight line appear to curve, thus impacting the overall map accuracy. To solve this problem, example embodiments provide an approach in which lines and arcs are extracted from the laser scan and used to provide precise rotational alignment. An example algorithm may therefore use the information to achieve accurate map results. After a scan has been registered in the map, the line equations are extracted and cached to provide a short term history of prior lines encountered in the map. When a new scan is added. Lines are extracted from the new scan and their equations are compared to the cached line history to find the optimal rotation to align the two. Using this mathematically calculated rotation gives the optimal rotation so the new scan only needs to be aligned in x and y coordinates. This provides at least two useful benefits. First, lines never accumulate error based on grid resolution and the scan matching algorithm execution time is significantly reduced by only having to search in two degrees of freedom (x & y) versus three (x, y and rotation) thus allowing the algorithm to operate in real time. The scan matching algorithm does not require lines to operate effectively, it is a novel hybrid approach that uses lines and arcs when available, and uses traditional scan matching when they are not present in the geometry.

When mapping cyclic environments (those with loops) conventional SLAM algorithms use particle filters or other approaches to maintain multiple map hypotheses and a statistical scoring and resampling to select the most correct map. An example embodiment may first, detect when one has encountered a cyclic environment and a loop needs to be closed and second, determine the necessary correction and apply it to the map. As mentioned above, a portion of the map that was first updated and last updated may be stored. This reflects an "age map" of the data in the map that can be used to determine when loop closure occurs. By tracking at each map update when a significant portion of "old" data in the map is being overwritten by new data in the map, it is possible to use this occurrence as a trigger to check for map error and provide a loop closure correction. When "old" map data is overwritten by new map data, the "old" data is not discarded but copied to a map buffer. We then have in effect two maps for the same location, one comprised of all the "old" data and one comprised of all the "new" most recent data. When the trigger has occurred to correct the loop, the most recent laser scan is scan matched independently to both the new and the old map data. If the scan is successfully registered in both maps, then the relative registration position is then used as the "error" accumulated since last visiting the "old" map location. The scans and scan match covariances of the laser scans used to create the map back to the "old" map location are retrieved from the data log. The map loop error and the uncertainty covariance of each prior scan registration is then used to distribute the observed error based on the magnitude and vector of the covariance data at each scan, thus correcting the loop error.

Figure 5:
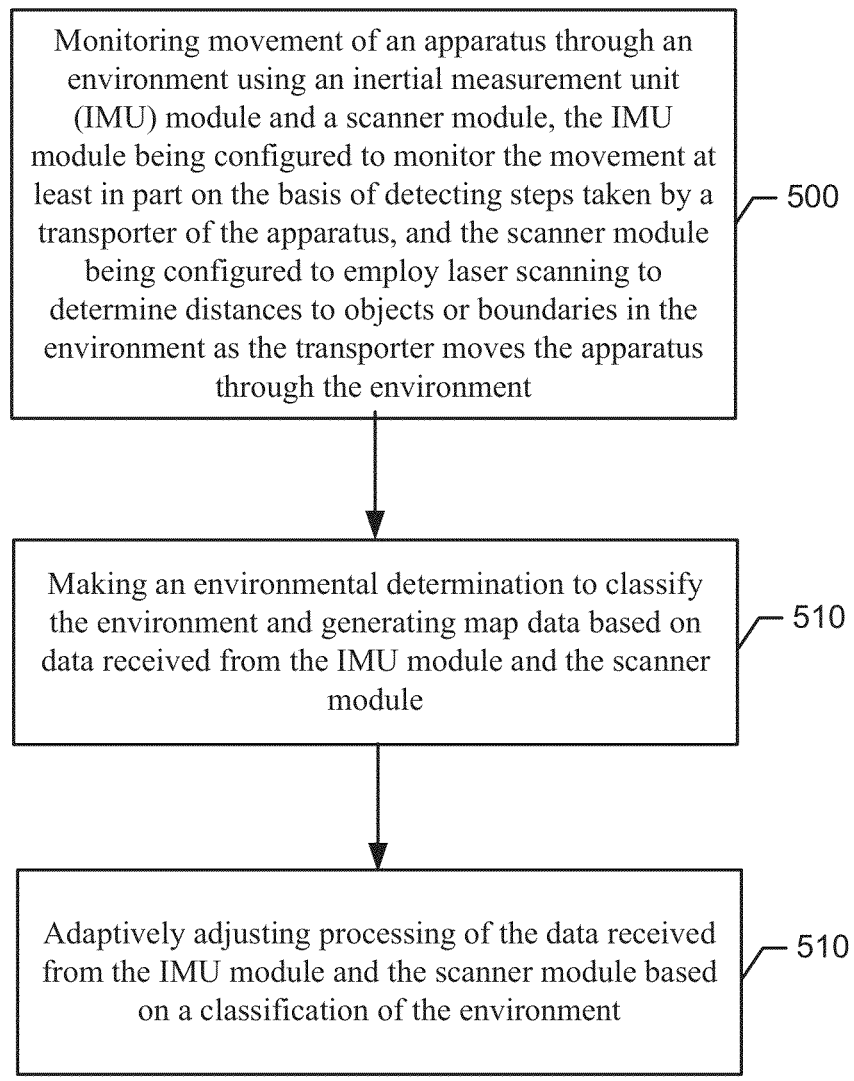
FIG. 5 illustrates a block diagram of a method of generating mapping and positioning data in accordance with an example embodiment.

FIG. 5 illustrates a method of processing data for map generation. The method may include monitoring movement of an apparatus through an environment using an inertial measurement unit (IMU) module and a scanner module at operation 500. The IMU module may be configured to monitor the movement at least in part on the basis of detecting steps taken by a transporter of the apparatus. The scanner module may be configured to employ laser scanning to determine distances to objects or boundaries in the environment as the transporter moves the apparatus through the environment. The method may further include making an environmental determination to classify the environment and generating map data based on data received from the IMU module and the scanner module at operation 510, and adaptively adjusting processing of the data received from the IMU module and the scanner module based on a classification of the environment at operation 520. In an example embodiment, the method may further include comparing aged map data to new map data to determine when a loop is encountered and, in response to determining that a loop has occurred, updating the map based on the comparison. In some cases, generating the map may include annotating the map with data gathered by one or more environmental sensors including radiological sensors, gas sensors, chemical sensors, RF sensors, spectrometers, magnetic sensors, temperature sensors, pressure sensors, or humidity sensors. In some embodiments, adaptively adjusting processing may include performing calculations based on a pace of the detected steps or rotation of the apparatus to avoid redundant calculations and enable real time mapping. In an example embodiment, generating the map data may include utilizing the IMU module to estimate linear motion and the scanner module to estimate rotation to generate the map data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A mapping and positioning apparatus comprising:
    an inertial measurement unit (IMU) module configured to monitor movement of the apparatus through an environment, the IMU module being configured to monitor the movement at least in part on the basis of detecting steps taken by a transporter of the apparatus;
    a scanner module configured to employ laser scanning to determine distances to objects or boundaries in the environment as the transporter moves the apparatus through the environment; and
    a control unit configured to receive data from at least the IMU module and the scanner module and make an environmental determination to classify the environment, the control unit further being configured to generate map data based on the data received from the IMU module and the scanner module, wherein the environment is classified based on the number of features and size of the environment,
    wherein the control unit is further configured to adaptively adjust processing of the data received from the IMU module and the scanner module based on a classification of the environment, wherein adaptively adjusting processing comprises shifting a balance of the generating map data between laser based processing and inertial movement based processing.

2. The mapping and positioning apparatus of claim 1, further comprising an altimeter to detect elevation or level changes.

3. The mapping and positioning apparatus of claim 1, further comprising a camera unit configured to obtain image data of the environment.

4. The mapping and positioning apparatus of claim 1, wherein the scanner module comprises a laser scanner configured to scan in two dimensions to define boundaries and objects a distance from the transporter in an XY plane.

5. The mapping and positioning apparatus of claim 4, wherein the scanner module further comprises a vertical line scanner to enable the scanner module to support three dimensional map generation.

6. The mapping and positioning apparatus of claim 1, wherein the apparatus is configured to be worn on a back of the transporter and the scanner module is configured to scan over 270 degrees to the side of and behind the transporter.

7. The mapping and positioning apparatus of claim 1, further comprising an IMU foot unit configured to communicate data indicative of steps taken by the transporter to the control unit via a short range wireless connection or a wired connection.

8. The mapping and positioning apparatus of claim 1, wherein the control unit is configured to employ constraints to reduce data processing and improve mapping performance if the environment is classified as a sliding environment.

9. The mapping and positioning apparatus of claim 1, wherein the apparatus further employs one or more environmental sensors including radiological sensors, gas sensors, chemical sensors, RF sensors, spectrometers, magnetic sensors, temperature sensors, pressure sensors, or humidity sensors.

10. The mapping and positioning apparatus of claim 1, wherein the apparatus is provided in a backpack configured to be worn by a human transporter.

11. The mapping and positioning apparatus of claim 1, wherein the apparatus is configured to be worn by a transporter that comprises a service animal.

12. The mapping and positioning apparatus of claim 1, wherein the apparatus is configured to be worn by a transporter that comprises a remotely operated or autonomous vehicle.

13. The mapping and positioning apparatus of claim 1, wherein the control unit is configured to perform calculations based on a pace of the detected steps or rotation of the apparatus to avoid redundant calculations and enable real time mapping.

14. The mapping and positioning apparatus of claim 1, wherein the control unit is configured to utilize the IMU module to estimate linear motion and the scanner module to estimate rotation to generate the map data.

15. The mapping and positioning apparatus of claim 1, wherein the control unit is configured to compare aged map data to new map data to determine when a loop is encountered and, in response to determining that a loop has occurred, update the map based on the comparison.

16. A method comprising:
monitoring movement of an apparatus through an environment using an inertial measurement unit (IMU) module and a scanner module, the IMU module being configured to monitor the movement at least in part on the basis of detecting steps taken by a transporter of the apparatus, and the scanner module being configured to employ laser scanning to determine distances to objects or boundaries in the environment as the transporter moves the apparatus through the environment;
making an environmental determination to classify the environment and generating map data based on data received from the IMU module and the scanner module, wherein the environment is classified based on the number of features and size of the environment; and
adaptively adjusting processing of the data received from the IMU module and the scanner module based on a classification of the environment, wherein adaptively adjusting processing comprises shifting a balance of the generating map data between laser based and inertial movement based.

17. The method of claim 16, further comprising comparing aged map data to new map data to determine when a loop is encountered and, in response to determining that a loop has occurred, updating the map based on the comparison.

18. The method of claim 16, wherein generating the map comprises annotating the map with data gathered by one or more environmental sensors including radiological sensors, gas sensors, chemical sensors, RF sensors, spectrometers, magnetic sensors, temperature sensors, pressure sensors, or humidity sensors.

19. The method of claim 16, wherein adaptively adjusting processing comprises performing calculations based on a pace of the detected steps or rotation of the apparatus to avoid redundant calculations and enable real time mapping.

20. The method of claim 16, wherein generating the map data comprises utilizing the IMU module to estimate linear motion and the scanner module to estimate rotation to generate the map data.

* * * * *